United States Patent Office 3,105,068
Patented Sept. 24, 1963

---

3,105,068
IMPROVED PREPARATION OF ALLOPREGNENO-
LONE AND PREGNADIENOLONE FROM TO-
MATIDINE AND SOLASODINE
Yoshio Sato, Rockville, Md., Erich Mosettig, Washington, D.C., and Nobuo Ikekawa, Tokyo, Japan, assignors to the United States of America as represented by the Secretary of Health, Education, and Welfare
No Drawing. Filed Mar. 9, 1961, Ser. No. 94,653
3 Claims. (Cl. 260—239.55)
(Granted under Title 35, U.S. Code (1952), sec. 266)

The invention described herein may be manufactured and used by or for the Government of the United States for governmental purposes only without payment of any royalty thereon.

The present invention discloses a process for the preparation of derivatives of the steroidal alkaloids tomatidine and solasodine.

More particularly, it relates to an improved process which is superior to the previously known process of preparing 3β-acetoxy-5α-pregn-16-en-20-one (allopregnenolone) and 3β-acetoxy-pregna-5,16-dien-20-one (pregnadienolone) from tomatidine and solasodine, respectively, as previously shown (Sato, Ikekawa, and Mosettig, Journal of Organic Chemistry, 24 pp. 893–894 (1959)). These products are useful for the production of progesterone, cortisone, and other steroid hormones by known methods such as that of Suvorov, N. M., et al., Khim. nauka i prom., volume 2, page 281; Suvorov et al., Med. prom. SSSR, No. 2, page 7; and Camerino et al., Gazz. chim. Ital., volume 83, page 795.

It is an object of this invention to provide an independent source of progesterone and its derivatives from Solanum species plants, such as *Solanum aviculave* and *Solanum xanthocarpum*, rather than being solely dependent on the source from Dioscorea (Mexican yams).

It is a further object to simplify the procedures for preparation of the needed intermediates, while at the same time increasing their yield.

According to the present invention, the conversion of either of the steroid alkaloids, O,N-diacetylsolasodine and O,N-diacetyltomatidine to the desired products pregnadienolone and allopregnenolone is enhanced by use of an acid salt of pyridine to produce as an intermediate, 26-acetylamino-5,20(22)-furostadien-3β-ol acetate from O,N-diacetylsolasodine and 26-aminoacetyl-5α-25L-furost-20-(22)-en-3β-ol acetate from O,N-diacetyltomatidine.

Representative acids which may be used to form the pyridine salt used in our invention are hydrochloric, etc., e.g., hydrobromic, sulfuric, sulfamic, phosphoric, nitric, p-toluene sulfonic acid, perchloric acid.

After formation of the above intermediate of either solasodine or tomatidine, it is oxidized with chromic anhydride in acetic acid, followed by the removal of the 16-acylester side chain by the use of acetic anhydride.

The equation shown below illustrates the process:

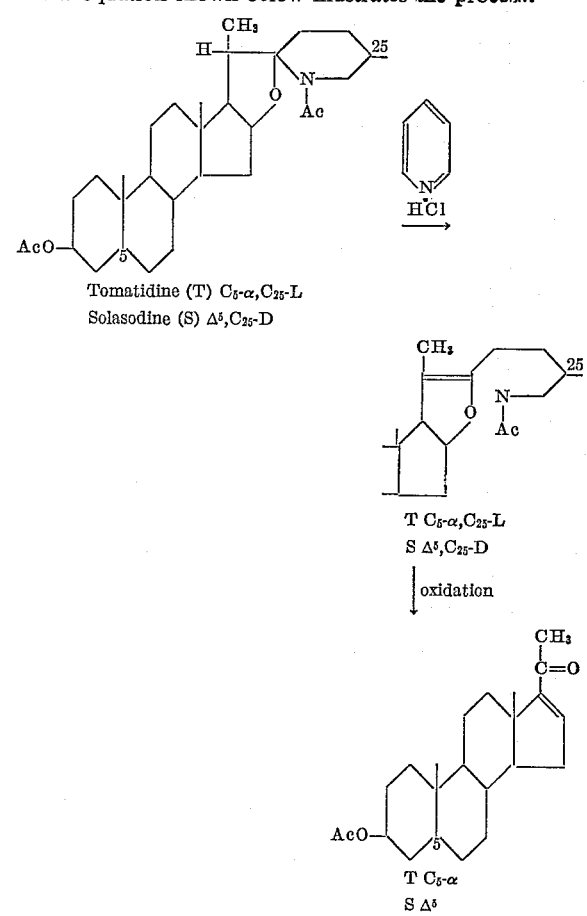

Tomatidine (T) $C_5$-α,$C_{25}$-L
Solasodine (S) $\Delta^5$,$C_{25}$-D

T $C_5$-α,$C_{25}$-L
S $\Delta^5$,$C_{25}$-D

↓ oxidation

T $C_5$-α
S $\Delta^5$

The following example will illustrate the process of our invention:

A solution of 2 g. of solasodine in 1.8 ml. of acetic anhydride (3.8 mol. equivalents) and 40 ml. of pyridine was refluxed for 1 hr., 3 g. of pyridine hydrochloride in 50 ml. of pyridine was then added and refluxing continued for 2 hrs. The volatile solvents were removed in vacuo and the residue dissolved in 60 ml. of acetic acid. A solution of 0.84 g. (2.6 mol. equivalents) of chromic anhydride in 20 ml. of acetic acid (80%) was added dropwise over a period of 15 min. while cooling the reaction flask in tap water (10–15°) and the reaction mixture allowed to stand for 1.5 hrs. at room temperature. Two milliliters of sodium sulfite solution (25%), 3 g. of sodium bicarbonate and 50 ml. of acetic anhydride were added successively and the resulting solution refluxed again for 2 hrs. The solution was concentrated to ca. 40 ml. and 100 ml. of water was added in small portions. The crystalline precipitate that had formed after 1 hr. was collected and washed with water. Recrystallization from methanol-water or chromatography through a short column of alumina (ether eluate) yielded 1.12 g. (65%)

of the desired product, M.P. 171–173°, $(\alpha)_D^{20}$ −35.4 (CHCl), identical (M.P., mixture M.P., rotation and infrared spectrum) with an authentic specimen of 5,16-pregnadien-20-one-3β-ol acetate.

*Analysis.*—Calc'd. for CHO: C, 77.49; H, 9.05. Found: C, 77.45; H, 9.11.

Propionic, butyric, and phthalic anhydrides may be employed in lieu of acetic anhydride for the initial refluxing. Also, in place of chromic anhydride, we can use permanganates, ozone, hydrogen peroxide in acetic acid.

While the present invention has been described with particular reference to specific examples, it is not to be limited thereby, but reference is to be had to the appended claims for a definition of its scope.

We claim:

1. The process of heating a steroidal alkaloid selected from the group consisting of tomatidine and solasodine with an aliphatic acid anhydride selected from the group consisting of acetic anhydride, propionic anhydride, butyric anhydride, and phthalic anhydride, in pyridine, at reflux conditions for about one hour, adding an acid salt of pyridine and continuing the refluxing for about two hours, oxidizing the resulting derivative while in solution with an oxidizing agent selected from the group consisting of chromic acid, permanganates, ozone, and hydrogen peroxide-acetic acid solution for about two hours at room temperature, adding acetic anhydride to remove the 16-acylester side chain while continuing refluxing for about two hours, and recovering the formed product.

2. The process of forming an intermediate reaction product by reacting O,N-diacetyltomatidine with pyridine hydrochloride at reflux conditions for about two hours.

3. The process of forming an intermediate reaction product by reacting O,N-diacetylsolasodine with pyridine hydrochloride at reflux conditions for about two hours.

References Cited in the file of this patent

Sato et al.: "Journal of Organic Chemistry," vol. 25, May 1960, pages 783–789 relied on.

Sato et al.: "Journal of Organic Chemistry," vol. 25, May 1960, pages 789–791 relied on.